Nov. 24, 1959 P. M. HALL ET AL 2,914,652
WELDING MACHINE ELECTRODES
Filed Oct. 22, 1957 2 Sheets-Sheet 1
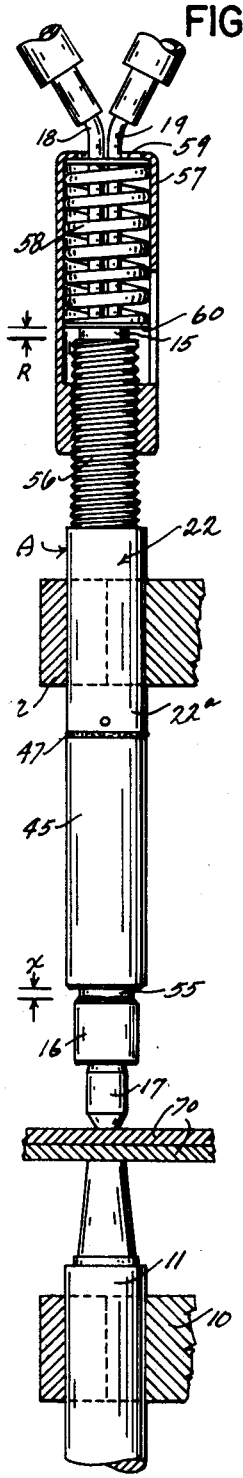
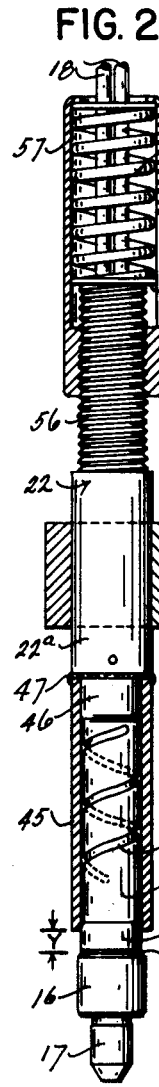
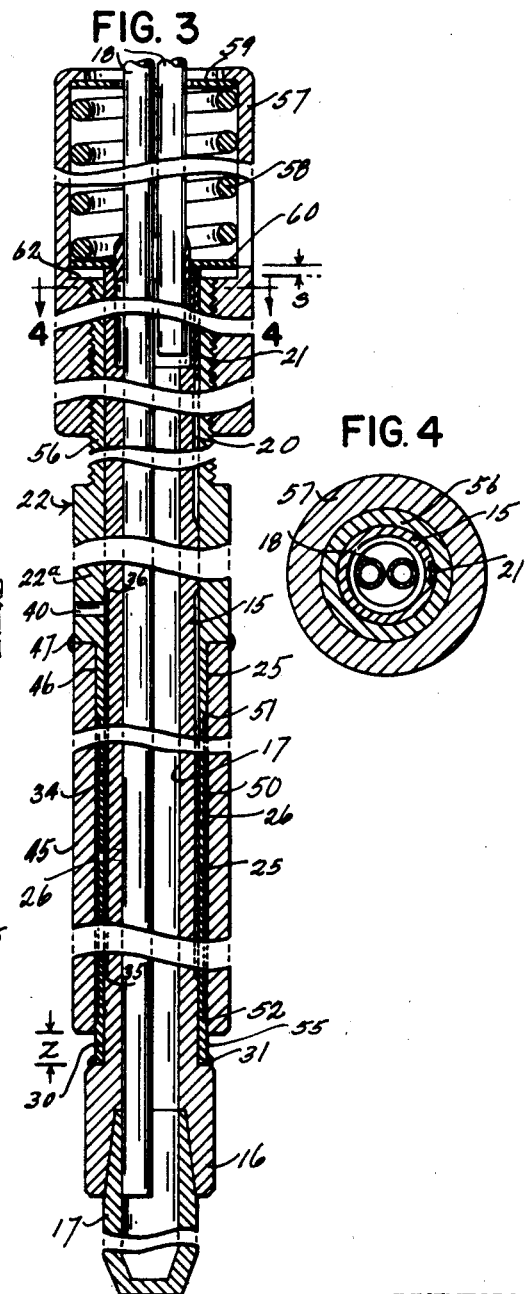
INVENTORS
Preston M. Hall
Richard H. Taylor
BY *Lancaster, Allwine & Rommel*
ATTORNEYS

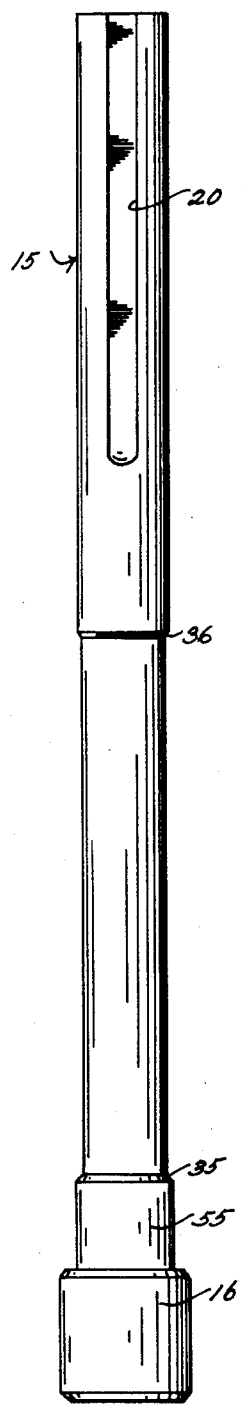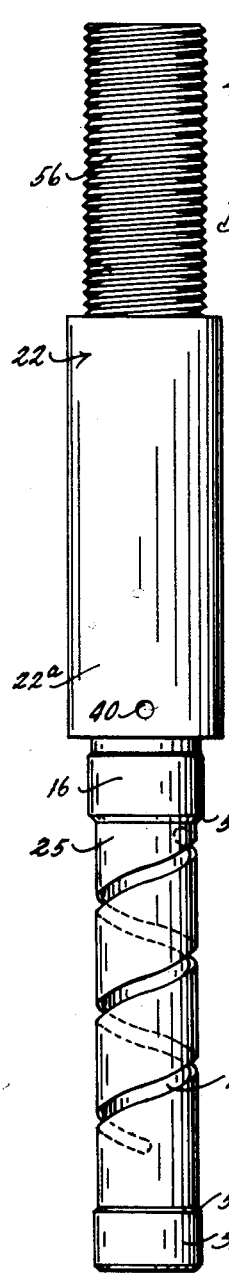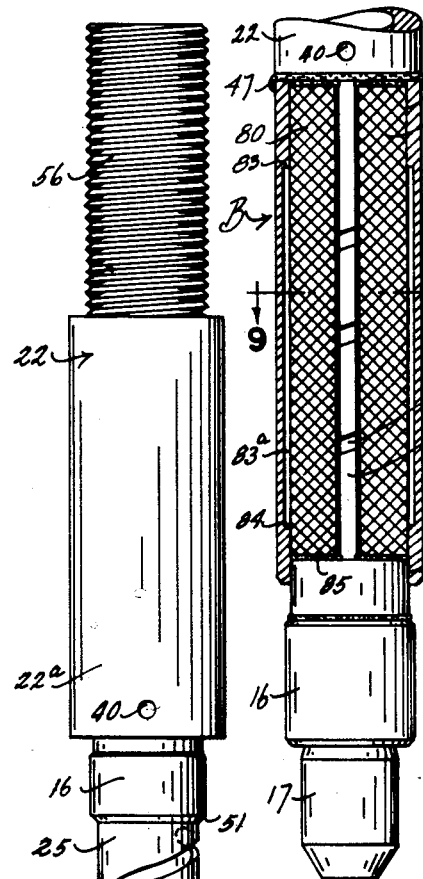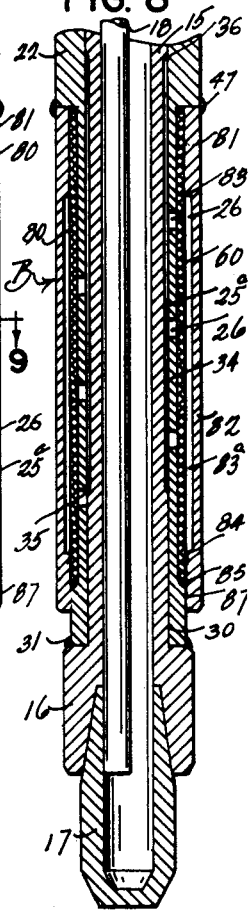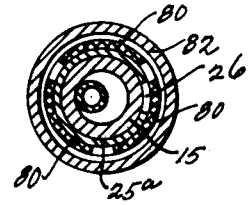

2,914,652
WELDING MACHINE ELECTRODES

Preston M. Hall, Silver Spring, Md., and Richard H. Taylor, Bridgeport, Conn.

Application October 22, 1957, Serial No. 691,763

19 Claims. (Cl. 219—120)

This invention relates to improvements in electrode holders for electrical resistance welding machines.

In U.S. Patent 2,208,977 is shown an electrode holder of the type to which the present invention generally relates. In the electrode holder of said patent the current passage from the stationary to the movable member is accomplished by the use of copper braid fastened at each end and providing a laterally flexible sleeve which is capable of carrying the welding current and of bulging outwardly with the longitudinal movement of the moveable inner member. There are problems in the use of exposed and unprotected braid because of the ease of damaging, rupture of the strands thereof incident to constant flexing, and the required added throat depth of the welding machine. It is a primary object of this invention to provide an electrode holder which will function essentially as well or better than that disclosed in Patent 2,208,977 and at the same time will overcome the defects above mentioned. This is accomplished by the provision of a current carrying tube, a portion of which is spirally slotted to give it longitudinal resiliency and capability of withstanding constant flexing.

A further object of the present invention is the provision of a rigid current conducting sleeve as an integral part of the electrode holder for the protection of a spiral cut portion of the outer tube and to provide an adequate current path from the welding machine through the spiral portion and on to the electrode and work being welded.

A further object of this invention is the provision of an electrode holder in which a spirally slotted current carrying tube member has attached to it relatively narrow current conducting braid strips, thereby providing a larger current path without adding objectionable resistance to longitudinal flexing. Such type of electrode holder is feasible in the larger sizes where the diameter is large enough to allow the addition of such copper strips and still leave internal room for free movement. It should be noted that the use of several narrow strips allows them to move towards each other without radial bulging when welding pressure is applied.

A further object of this invention is the provision of an improved electrode holder for electric welding machines in which a shorter path of the electric current provides greater efficiency of the welding circuit. This is accomplished in this improved holder by providing a rigid current carrying sleeve which may be gripped in the welding machine substantially nearer the work piece, thus allowing the horns of the welding machine to be adjusted closer together. This close adjustment substantially reduces the area of the secondary circuit gap of the welding machine; it being a fact that the efficiency of a resistance welding machine varies inversely with the area of the secondary gap.

Other objects and advantages of this invention will be apparent during the course of the following detailed description.

In the drawings wherein similar reference characters designate corresponding parts throughout the several views:

Figure 1 is a longitudinal view of the improved electrode holder, partly in section, showing the position the parts take during a welding operation.

Figure 2 is a view of the electrode holder shown in Figure 1, out of work contact, but with the spring thereof under compression.

Figure 3 is a fragmentary longitudinal cross sectional view taken through the improved electrode holder of Figures 1 and 2, with the spring out of compression.

Figure 4 is a transverse cross sectional view taken substantially on the line 4—4 of Figure 3.

Figure 5 is a side elevation of an improved inner tubular member for the electrode holder.

Figure 6 is a side elevation of the improved outer tubular member of the electrode holder, showing a novel spirally slotted extensible electrical conductive portion thereon.

Figure 7 is a fragmentary view, partly in section, showing a modified form of electrode holder.

Figure 8 is a fragmentary vertical cross sectional view taken longitudinally through the electrode holder of Figure 7.

Figure 9 is a transverse cross sectional view taken substantially on the line 9—9 of Figure 7.

In the accompanying drawings, wherein for the purpose of illustration are shown different forms of the invention, the letter A may generally designate a type of electrode holder suitable for smaller sizes, and B a type of electrode holder adaptable for use in connection with electrode holders of larger sizes, for heavier welding operations.

The electrode holders A and B are adapted for use in connection with conventional types of electrical resistance welding machines, wherein is provided a lower adjustably fixed arm 10 adapted to support a fixed electrode holder 11 and an upper movable arm or portion 12 in which the electrode holders A or B are removably clamped.

Referring to the form of electrode holder A, the same includes an inner tubular member 15, of electrical conductive material, such as copper or alloy, having a lower enlarged wrench engaging head 16 for receiving therein a welding electrode 17. Usually these electrodes are provided with a Morse taper, detachably fitting into a complimentary tapered socket in the head 16, as shown in the drawings. The tube 15 is provided with a passageway 17 longitudinally therethrough adapted to receive the usual water cooling tubes 18, as shown in Figure 3, one of which extends into the electrode for directing cooling fluid thereto. These tubes are usually soldered in the inner tube member 15. A longitudinally extending keyway 20 is provided externally upon the tube 15 opening on the upper end thereof and extending for a short distance therealong, for receiving a key 21 and thus splining the outer tube member 22 upon tube 15. The tubes 15 and 22 thus have longitudinal but not rotational relative movement.

The outer tube 22 includes an upper portion 22ª in which the upper part of the inner tube 15 has a sliding fit. The lower end of the tube 22 preferably comprises a diametrically reduced portion 25. It has a spiral slot therethrough, shown at 26 in Figure 2 of the drawings, and elsewhere, and this produces a spiral shape of portion 25. The convolutions of the slot 26 are widely spaced, and they render the portion 25 capable of longitudinal extension and contraction; the material of the tube being copper or some other material of high electrical conductivity, and sufficiently resilient to enable the spiral portion 25 to return to normal position after extension or contraction.

In assembly, the spiral portion 25 has a press fit at- 30 upon the lower end of the inner tube or member 15 just above the electrode supporting head 16, and it is there soldered or otherwise secured to tube 15, as at 31. This fixes the lower end of the extensible spiral portion 25 upon the inner tubular member 15, in the position shown in Figure 3 of the drawings. It will be noted from Figure 3 that the inner tube member 15 is externally diametrically reduced throughout the length thereof from a lower location 35 to an upper location 36, for the purpose of providing a small clearance 34 between the outer surface thereof and the inner surface of the spiral portion 25, to take care of any slight expansion of the spiral portion 15 when it is under lengthwise compression. We provide a port 40 in the outer tube member 22 which opens into this clearance space for lubrication purposes, in order to prevent wear upon any facing surfaces of the inner tube member 15 and the spiral portion 25 which may come in contact with each other during relative movement of the parts.

For the purpose of carrying current to the spiral member 25 and in order to serve as a guard for it, we provide a sleeve 45 which has a passageway therethrough. It has a press fit at 46 upon the upper end of the spirally slotted portion 25 above the spiral slot therein, and is soldered and securely affixed at 47 to the bottom edge of the enlarged portion 22ᵃ of tube 22, as shown in Figure 3. It is to be noted that the spiral portion 25, at the locus of the press fit 46, is of a slightly larger diameter to provide a clearance space 50 extending from a point 51 below the locus of the press fit to a location 52 spaced from the lower end portion of the spiral portion 25. This space receives lubricant to prevent wear upon the parts incident to a longitudinal flexing and a slight lateral expansion of the spirally slotted portion 25. It will be noted that the lower end of the spiral portion 25 is diametrically enlarged at 55 and has a close sliding fit in the lower end of the passageway of the guard sleeve 45.

The upper end 56 of tube 22 is externally screw-threaded for detachably receiving thereon a cage or frame 57 which houses a spiral compression spring 58 therein. The spring 58 at its upper end engages against a captive washer 59 in the cage, and engages at its lower end against a washer 60 which rests normally upon the upper edge of the inner tube or sleeve 15, but which under certain circumstances also contacts the annular seat 62 in the cage. The spring 58 can be compressed by rotating the cage upon the screw threaded end 56 of the outer tube 22.

In Figure 3 it is shown that the top end of the inner tubular member 15 projects a distance S above the end surfaces of the flush top edges of the sleeve portion 56 and the cage. With the compression of the spring 58 at zero and the electrode not in use, the spirally slotted sleeve 25 will assume the position shown in Figure 3, and at which time the upper end of the inner tube will project for the distance S above described, and the lower edge of the guard sleeve 45 will be spaced from the weld 31 the distance Z.

If it is intended to weld, say with an initial compression of 125 pounds upon the electrode tip and against the work 70 the cage 57 is rotated to the desired extent, and because of the compression of the spring, the inner tube 15 will be forced downwardly and will stretch the spiral sleeve portion 25 along the slot 26. This position of parts is shown in Figure 2, and it will be noted that the lower edge of the guard sleeve 45 is spaced the distance Y from the location where the sleeve 25 is welded thereto.

The position of parts shown in Figure 1 are assumed during a welding operation. It is shown that pieces of work 70 are located between the fixed electrode 11 and welding electrode 17, and upon movement of the electrical resistance machine arm 12, the electrode holder outer sleeve will be moved downwardly. This forces the spring 58 into further compression and under such circumstances that the lower edge of the guard sleeve 45 is then spaced the distance X from the location where the lower end of the sleeve portion 25 is soldered to the inner tube. The top portion of the inner tube 15 will then be extended for the distance R shown in Figure 1, above the top edge of the screw-threaded portion 56 of the outer sleeve 22.

It will be seen from the foregoing that with the elimination of braided electrical conducting sleeves of electrode holders, such as set forth in Patent 2,208,977, the life of the entire electrode is greatly extended, since there is no element which wears out quickly or is exposed to external damage. Movable parts are protected by the guard sleeve 45, from any outside contact, such as accidental contact with work pieces, wrenches, etc. With this arrangement an increased gripping length is provided upon the holder. Greater efficiency in the operation of the transformer is permitted because of decreased area in the secondary gap.

In the form of invention A electrical conductivity is located in guarded relation in a manner which permits efficient passage of the current upon smaller sizes of electrodes. Spirally slotted current carrying electrode holders in one inch sizes and smaller may be efficiently utilized.

The advantage of stretching the spirally slotted portion 25 and placing the same under stress enables it to return to normal length dimension without necessitating machine pressure to make the initial movement of the inner tube. It is obvious that the spiral cut in portion 25 allows additional compression during the welding operation.

Referring to the form of invention B shown in Figures 7, 8 and 9, the same reference characters have been applied to this form of invention, wherever applicable, as have been given to the form of invention A. In form B, however, it is preferred to provide braided electrical conductor strips 80, three of which are shown in the cross sectional view of Figure 9, the upper ends of which are soldered and held in a pressed fit between the upper end of the slotted portion 25ᵃ and the upper end 81 of a guard sleeve 82 which corresponds to the sleeve 45 of the form of invention A. There is a clearance 83ᵃ provided along the major length of the strips 80 between the locations 83 and 84, shown in Figure 8, which permits flexibility of the braided strips 80, that is, bulging as a result of relative movement between the inner and outer tubular members. In this spiral form 25ᵃ the outer surface need not be reduced, since the braid 80 may lie flat thereagainst, and this is in contradistinction to the form of invention A. The lower end of the braid has a soldered connection at 85 upon the portion 25ᵃ below its slot, and the lower end of the sleeve 82 at 87 has a sliding fit on the lower end of the tube 25 and along a part of the distance where the braid strips are secured thereto.

In the form of invention shown in Figures 7, 8 and 9 the braid increases the current carrying capacity of the electrode holder, presenting a larger path for current, with less resistance. While three braided strips 80 have been shown, it is not desired to be limited thereto. The spacing between the edges of the strips 80 may be in the relation shown in Figure 9, with the distance between the facing edges of the strips appreciably less than the widths of the individual strips.

Various changes in the shape, size and arrangement of parts may be made to the forms of invention herein shown and described, without departing from the spirit of the invention or the scope of the claims.

We claim:

1. An electrode holder for electrical resistance welding machines comprising an outer tube for clamping upon an electrical resistance welding machine and having a passageway therealong, an inner tube slidable in the outer tube passageway and projecting from an end of the outer tube and there having means for supporting an electrode, compressible spring means for forcing the inner tube in the direction of said electrode supporting projecting end of the inner tube, said inner tube and outer tube having connected as a part thereof an electric current conducting sleeve connected at opposite ends to the inner tube and outer tube and being longitudinally extensible and contractible.

2. An electrode holder as defined in claim 1 in which the extensible and contractible tubular portion is provided with a spiral slot therealong and through the thickness thereof to render it resiliently extensible and contractible.

3. An electrode holder as defined in claim 1 in which the outer tube has a current carrying guard sleeve externally covering and receiving therein the extensible and contractible portion.

4. An electrode holder as defined in claim 2 in which the outer tube has a current carrying sleeve affixed thereon which externally covers and receives therein the extensible and contractible slotted portion.

5. An electrode holder for electrical resistance welding machines comprising an inner tube having means at an end thereof for attachment of the welding electrode thereto, an outer tube slidably receiving the inner tube therein and having a longitudinally extensible spirally slotted portion connected to the inner tube in proximity to the location where it has means for attaching a welding electrode thereto, and compressible spring means for normally urging the inner tube along the outer tube and in the direction of the welding electrode supporting means.

6. An electrode holder as defined in claim 5 in which the spring means under compression normally acts upon the inner tube to stretch the spirally slotted portion when said spring means is under compression.

7. An electrode holder as defined in claim 6 in which the outer tube is provided with a current carrying guard sleeve enclosing the spirally slotted portion therein.

8. An electrode holder for electrical resistance type welding machines comprising an inner tubular member, an outer current carrying protective sleeve having a passageway slidably receiving the inner tubular member with an end projecting therefrom having means for supporting a welding electrode, a spirally slotted electrical conducting portion connected at one end to the current carrying protective sleeve and at its opposite end connected to the inner tube, said spirally slotted portion being longitudinally resilient.

9. In an electrode holder adapted for use in electrical welding machines the combination of an inner welding electrode supporting tubular member, an outer welding machine clamping tubular member having a passageway slidably receiving therein the inner tubular member, and having an extensible electrical conductive transversely slotted member connected to the tubular member at one end and at its other end being connected to the inner tubular member.

10. An electrode holder as defined in claim 9 in which an annular clearance exists between the outer surface of the inner tube and the inner surface of the spirally slotted portion throughout the length of the slot of the latter.

11. An electrode holder as defined in claim 10 in which the outer tubular member is provided with a current carrying protective sleeve affixed therewith and receiving the spirally slotted portion of the outer tube therein and the inner surface of which protective sleeve is annularly spaced from the outer surface of the spirally slotted portion of the outer tube throughout the length of the slot of the latter.

12. An electrode holder for electrical resistance welding machines comprising an inner tubular member having a passageway therethrough, means at an end of said inner tubular member for supporting a welding electrode, means for circulating a cooling fluid through the passageway and welding electrode, a welding machine clamping outer tubular member having a passageway therein slidably receiving the inner tubular member therein, a laterally and longitudinally transversely slotted portion connected at one end as part of the outer tubular member and receiving the inner tubular member therein and affixed at its opposite end to the inner tubular member in the proximity of the location where the welding electrode is secured to the inner tubular member, the transverse slots of said slotted portion permitting longitudinal resilient extension thereof and the normal position of the slotted portion being such as to project an end thereof opposite the welding electrode supporting end a short distance beyond the adjacent end of the outer tubular member, compressible spring means carried by the outer tubular member acting upon said projecting end above the inner tubular member when compressed for forcing the inner tubular member along the outer tubular member and stretching the slotted sleeve.

13. An electrode holder as defined in claim 12 in which the outer tubular member is provided with a fixed guard sleeve portion externally surrounding the slotted portion of the outer tube.

14. An electrode holder as defined in claim 13 in which annular clearances are provided between the slotted portion of the outer tube at the location of the slots therein between the inner and outer surfaces thereof and the adjacent facing surfaces of the inner and outer tubular members.

15. An electrode holder as defined in claim 1 in which electrically conductive laterally flexible braided means is connected externally upon the extensible and contractible portion of the outer tube secured at its upper end to the outer tube and at its lower end to the inner tube and being laterally flexible and movable with respect to the intermediate portions of said longitudinally extensible and contractible sleeve.

16. An electrode holder as defined in claim 2 in which braided electrically conductive flexible means is provided in surrounding external relation upon the spirally slotted portion of the outer tube secured at its upper end to the outer tube and at its lower end to the inner tube with its intermediate portion along the locus of the spiral slot being laterally movable with respect to the slotted portion.

17. An electrode holder as defined in claim 16 in which said braided means comprises circumferentially spaced elongated braided conductor strips.

18. An electrode holder as defined in claim 16 in which a guard sleeve is affixed to the outer tube covering said spirally slotted portion, said braided means having a clearance provided between the inner surface of said guard sleeve and the braided means to permit bulging of the braided means and longitudinal extension of the spiral portion.

19. An electrode holder for electrical resistance welding machines comprising an outer tube for use in an electrical resistance welding machine and having a passageway therealong, an inner tube slidable in the outer tube passageway and projecting from an end of the outer tube and there having means for supporting an electrode, compressible spring means for forcing the inner tube in the direction of the electrode supporting projecting end of the inner tube, said inner tube and outer tube having as a part thereto an electric current conducting portion connected to the inner tube and a rigid guard sleeve connected to said outer tube and surrounding said electrical current conducting portion of the outer tube.

References Cited in the file of this patent

UNITED STATES PATENTS 2,208,977    Hall  ---------------- July 23, 1940